United States Patent
Kubsch et al.

(10) Patent No.: US 8,767,740 B2
(45) Date of Patent: Jul. 1, 2014

(54) METHOD OF MANAGING A PACKET ADMINISTRATION MAP

(75) Inventors: Stefan Kubsch, Hohnhorst (DE); Eduard Siemens, Sehnde (DE); Andreas Aust, Hannover (DE)

(73) Assignee: TIXEL GmbH, Hannover (DE)

( * ) Notice: Subject to any disclaimer, the term of this patent is extended or adjusted under 35 U.S.C. 154(b) by 129 days.

(21) Appl. No.: 13/259,898

(22) PCT Filed: Mar. 24, 2010

(86) PCT No.: PCT/EP2010/053840
§ 371 (c)(1), (2), (4) Date: Sep. 23, 2011

(87) PCT Pub. No.: WO2010/108958
PCT Pub. Date: Sep. 30, 2010

(65) Prior Publication Data
US 2012/0020360 A1    Jan. 26, 2012

(30) Foreign Application Priority Data
Mar. 25, 2009    (EP) .................................. 09305264

(51) Int. Cl.
*H04L 12/28* (2006.01)
(52) U.S. Cl.
USPC ........................................................ 370/394
(58) Field of Classification Search
USPC .................. 370/394, 474; 714/18, 748–750
See application file for complete search history.

(56) References Cited

U.S. PATENT DOCUMENTS

| | | | |
|---|---|---|---|
| 4,841,526 A * | 6/1989 | Wilson et al. | 714/748 |
| 5,822,524 A | 10/1998 | Chen et al. | |
| 6,496,830 B1 | 12/2002 | Jenkins, Jr. | |
| 2003/0014705 A1 | 1/2003 | Suzuki et al. | |
| 2005/0198028 A1 * | 9/2005 | Padmanaban et al. | 707/6 |
| 2007/0053303 A1 | 3/2007 | Kryuchkov | |

FOREIGN PATENT DOCUMENTS

| | | |
|---|---|---|
| EP | 0969623 A2 | 1/2000 |
| EP | 1458145 A1 | 9/2004 |
| WO | 01/76189 A2 | 10/2001 |

OTHER PUBLICATIONS

International Search Report dated May 6, 2010 for related International application No. PCT/EP2010/053840.

* cited by examiner

*Primary Examiner* — Mark Rinehart
*Assistant Examiner* — Peter Cheng
(74) *Attorney, Agent, or Firm* — Howard IP Law Group, PC

(57) ABSTRACT

A method of managing a packet administration map for data packets to be received via a network. A receiver in the network monitors sequence numbers and stores missing sequence numbers within an internal data structure, called a packet administration map. A reversed keying is used which means that the upper limit of the range of contiguous missing data packets is used as the key entry in the administration map.

13 Claims, 4 Drawing Sheets

METHOD OF MANAGING A PACKET ADMINISTRATION MAP

CROSS REFERENCE TO RELATED APPLICATIONS

Figure 1:
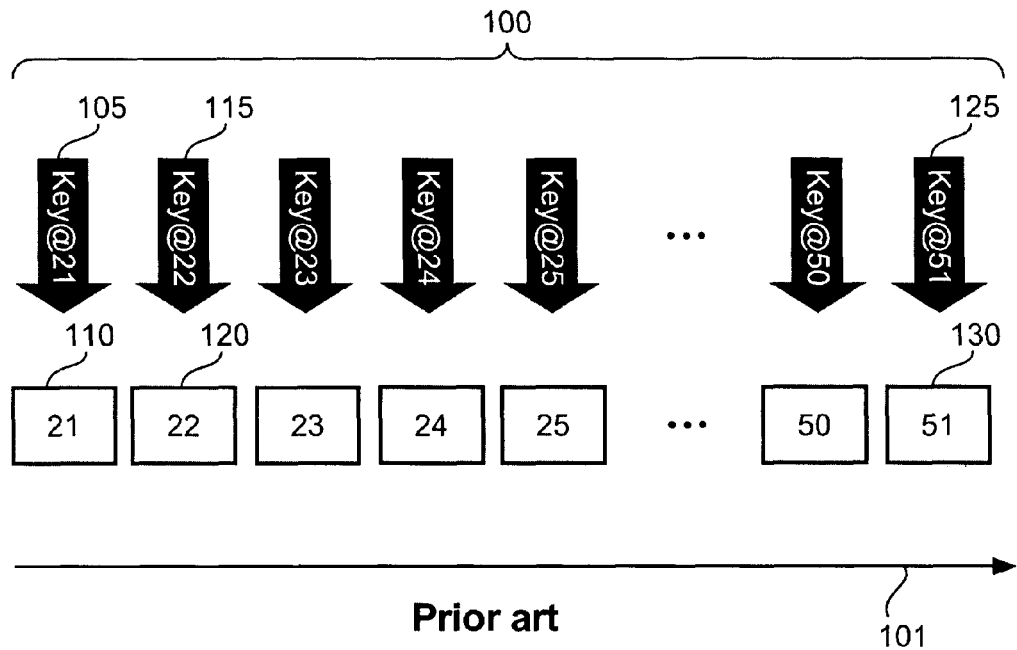

This application is the national stage application under 35 U.S.C. §371 of International Application No. PCT/EP2010/053840 and claims the benefit of International Application No. PCT/EP2010/053840, filed Mar. 24, 2010, and European Application No. 09305264.5, filed Mar. 25, 2009, the entire disclosures of which are incorporated herein by reference in their entireties.

FIELD OF THE INVENTION

The present invention relates to a method of managing a packet administration map for data packets to be received via a network, particularly for packet groups organized in sequences of consecutive packets.

BACKGROUND OF THE INVENTION

In the field of networking and reliable data transport, as for example in case of TCP, bursty packet drops occur during a data transmission. A bursty packet drop might occur due to a disturbance on the network or different packet run times due to different paths via the network. Especially in high speed networks like in 10 Gb Ethernet, the handling of lost and retransmitted packets can introduce a disproportionate decrease of the net data rate. In the field of, e.g., high speed video transmission, a user experiences visible disruption when bursty packet drops occur and the CPU is not fast enough to recover the sequential packets in time. Data packets sent via the network are identified by subsequently increasing sequence numbers so that it is possible for a receiver to determine, whether or not a packet is missing. In case the receiver successfully receives a packet, it sends to the sender an acknowledge message comprising the sequence number of that successfully received packet.

A reliable transport protocol usually retransmits a data packet that a receiver was not able to receive and thus was not acknowledged. In order to manage data packets that are retransmitted, a receiver in the network monitors sequence numbers and stores missing sequence numbers within an internal data structure, hereinafter called packet administration map. For performance reasons the received packets are usually subsequently stored in a receive buffer, sorted according to their sequence numbers. The packet administration map is used to map the retransmitted packets by means of the sequence number to corresponding receive buffer addresses. When a missing packet arrives at the receiver, the receiver needs to update the packet administration map in order to track the progress of the data reception. This map administration overhead needs to be carried out more often when there are numerous transmission errors, that is, when the retransmission rate increases. Depending on the used transport protocol, the overall sending data rate can also be increased, which in total could consume a significant amount of processing power.

In the document WO 01/76189 A2 a data sequencing algorithm using several timers is disclosed.

In the document US 2007/0053303 A1 a means of measuring or estimating the subjective or perceptual quality of decoded audio, voice or video data received over a network is described.

THE INVENTION

It is an object of the invention to provide an improved method of managing a packet administration map, particularly, a method that permits a faster management of packet administration information of data packets to be received via a network.

According to one aspect of the invention, a method of managing a packet administration map for data packets to be received via a network, particularly for packet groups organized in sequences of consecutive packets, is provided. The packet administration map comprises at least one map entry comprising a search key entry and a value entry, the at least one map entry indicating a range of contiguous data packets. The method comprises the following steps: receiving a current sequence number of a current data packet, evaluating, whether the current sequence number belongs to a new packet loss, creating, dependent on the result of the step of evaluating, a new map entry with an upper sequence number of the range of contiguous data packets as the search key entry, using, as the search key entry in the at least one map entry, the upper sequence number of the range of contiguous data packets, finding, dependent on the current sequence number, the at least one map entry matching the current sequence number, determining, whether the current sequence number falls into the range of contiguous data packets indicated by the found map entry, and updating, dependent on the result of the step of determining, the packet administration map.

According to another aspect of the invention, a receiver for a network is provided, the receiver being adapted to operate according to the above described method.

According to another aspect of the invention, a sender for a network is provided, the sender being adapted to operate according to the above described method wherein the data packets are provided as acknowledge packets. The sender receives the acknowledge packets from the receiver and manages the acknowledge packets in its administration map.

According to another aspect of the invention, a computer program product with program code is provided that is adapted to execute the above described method when the code is operated on a computer.

According to another aspect of the invention, a computer program is provided that comprises instructions that are adapted to execute the above described method when the code is operated on a computer.

When a receiver that operates according to the invention receives a data packet that is provided with a current sequence number, it checks, whether or not the newly received packet is a packet that is retransmitted and which the receiver has been waiting for. If a quick pre-check, e.g. according to the largest received sequence number, is not successful this is done by performing a search through the packet administration map using the current sequence number of the received packet. The packet administration map is used to provide a mapping from a sequence number to a corresponding buffer address. The packet administration map comprises at least one map entry indicating a contiguous range of data packets that are not yet received. The map entry consists of a key entry and a value entry. The specialty with respect to the map entry is that the key entry is identical to the upper sequence number of the range of contiguous data packets. This approach can also be called reverse key assignment in order to distinguish over the prior art approach that uses a forward key assignment. In a subsequent step, according to the method, the at least one map entry is found. Based on the map entry and the current sequence number it is determined, whether or not the current sequence number falls into the range of contiguous data packets that is indicated by the found map entry. In case the current sequence number falls into this range, the packet associated with the current sequence number will be stored in a receive buffer and the packet administration map has to be updated in order to keep track with the fact that the packet associated with the current sequence number now is not missing any longer. The packet administration map might be implemented as an associative memory.

The advantage of this method is the reversed keying which means that the upper limit of the range of contiguous missing data packets is used as the key entry in the administration map. As the retransmitted packets usually are retransmitted in an increasing order of sequence numbers, it becomes very seldomly necessary to split a packet administration entry or to create a new packet administration entry. Instead, it is sufficient to update the lower sequence number and lower buffer address, which is much less time consuming than the deletion of old entries and creation of new entries. Thus, CPU usage is decreased and spared CPU resources can be used more meaningful by the application. The advantage will be explained in further detail below.

In a preferred embodiment, the value entry of the at least one map entry comprises at least a lower sequence number of the range of contiguous data packets. In other words, the key entry of the map entry is identical to the upper sequence number of the range of contiguous packets and the value entry comprises at least the lower sequence number of the range of contiguous packets.

The value entry additionally comprises at least a reference to a packet space in a packet buffer. This reference might be a receive buffer pointer pointing into a location in the receive buffer where the freshly received data packet is to be stored. Further, the value entry might for the reason of redundancy, e.g. for faster processing, also comprise the upper sequence number that is already contained in the key entry.

In a further preferred embodiment, the step of updating the packet administration map comprises at least one of: incrementing the lower sequence number in the value entry, creating a new map entry with the current sequence number decremented and assigned to the search key entry of the new map entry and deleting a map entry.

According to another embodiment of the invention, the at least one map entry matches the current sequence number if the current sequence number is closest to the key entry of the at least one map entry. In case the packet administration map comprises plural entries, it is thus ensured that only that map entry is further investigated which might be of interest for a further processing with respect to the current sequence number.

In one embodiment, the data packets are of different sizes.

According to a further embodiment of the invention, the at least one map entry in the packet administration map indicates a range of contiguous data packets that did not arrive at a receiver.

According to a preferred embodiment of the invention, the computer program is stored on a data storage medium. The data storage medium may be a HDD, a flash memory, a USB stick, a memory card, a floppy disk, CD, DVD or a volatile memory of a digital device like film cameras.

It is contemplated to store the sequence numbers until the data packets are received without any gaps. It is preferred to store the biggest sequence number received, indicating the part of sequences where are loss sequences. This information might be used to distinguish a new packet from a potentially retransmitted packet.

In a further embodiment, at least one additional packet administration map might be employed in order to support a wrap-around of the sequence numbers. It is further contemplated to take the sequence number wrap-around into account when performing the above described method.

In a further preferred embodiment, the sequence numbers might be used for a mapping to corresponding buffer addresses.

According to a further preferred embodiment of the invention, the above described method could be used on the sender and receiver side in reliable transport protocols in order to track sequences of packets not received yet, or loss sequences.

According to a still further preferred embodiment of the invention, the packet administration map is implemented in C++ using the Standard Template Library (STL) maps, or in Java using the Java Development Kit (JDK) Map Collections like, e.g., HashMap, or any other programming language that directly or indirectly supports associative memories.

To summarize, the proposed method preferably permits a sequencing of data packets arriving via a network in a more efficient manner. As a result, an improved perceptual quality of decoded audio, voice or video data received over a network is preferably provided without a need for additional hardware components. The underlying reason for the improvement is that a creation of new map entries in the packet administration map is avoided, as far as possible, and the existing map entries are used, as far as possible. This unloads the CPU from expensive map entry construction calls. Thus, the CPU is relieved in order to improve a perceptual quality of signals received via the network. The cause for the benefit of the suggested method is the use of the keys assigned in reverse order.

The invention can preferably be used in any case where data have to be received and/or processed in a certain order. A prerequisite for the application of the above described method is preferably that the data are sent sequentially in addressable parts via a channel that might cause data losses.

DESCRIPTION OF PREFERRED EMBODIMENTS OF THE INVENTION

Figure 2:
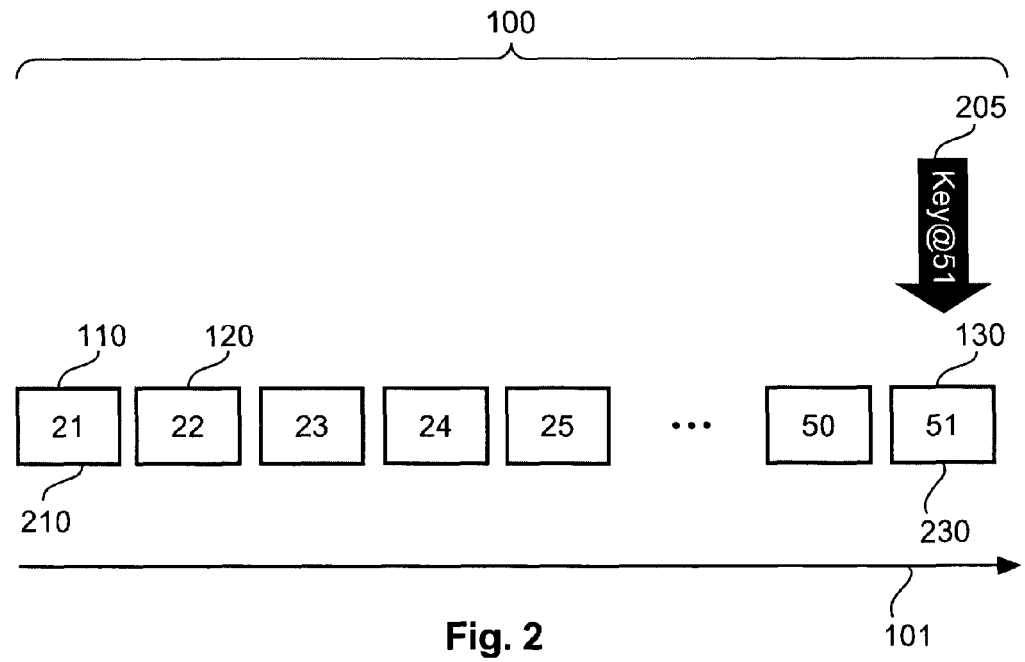
Figure 3:
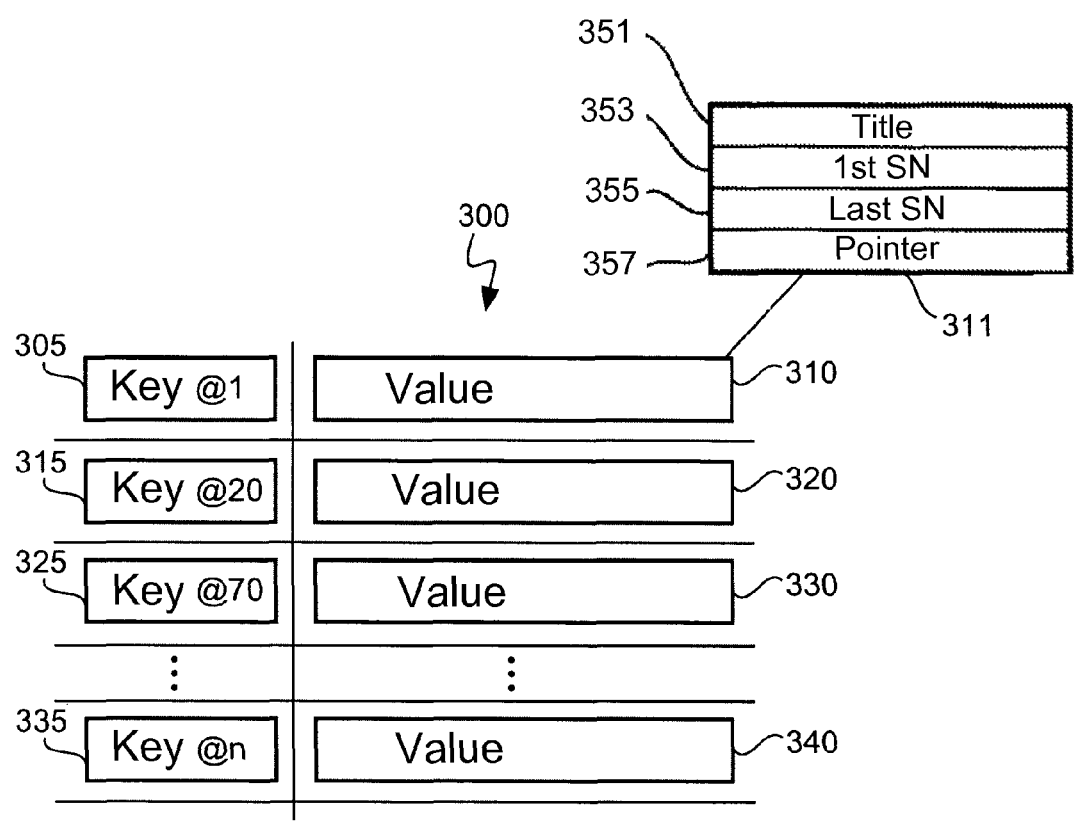
Figure 4A:
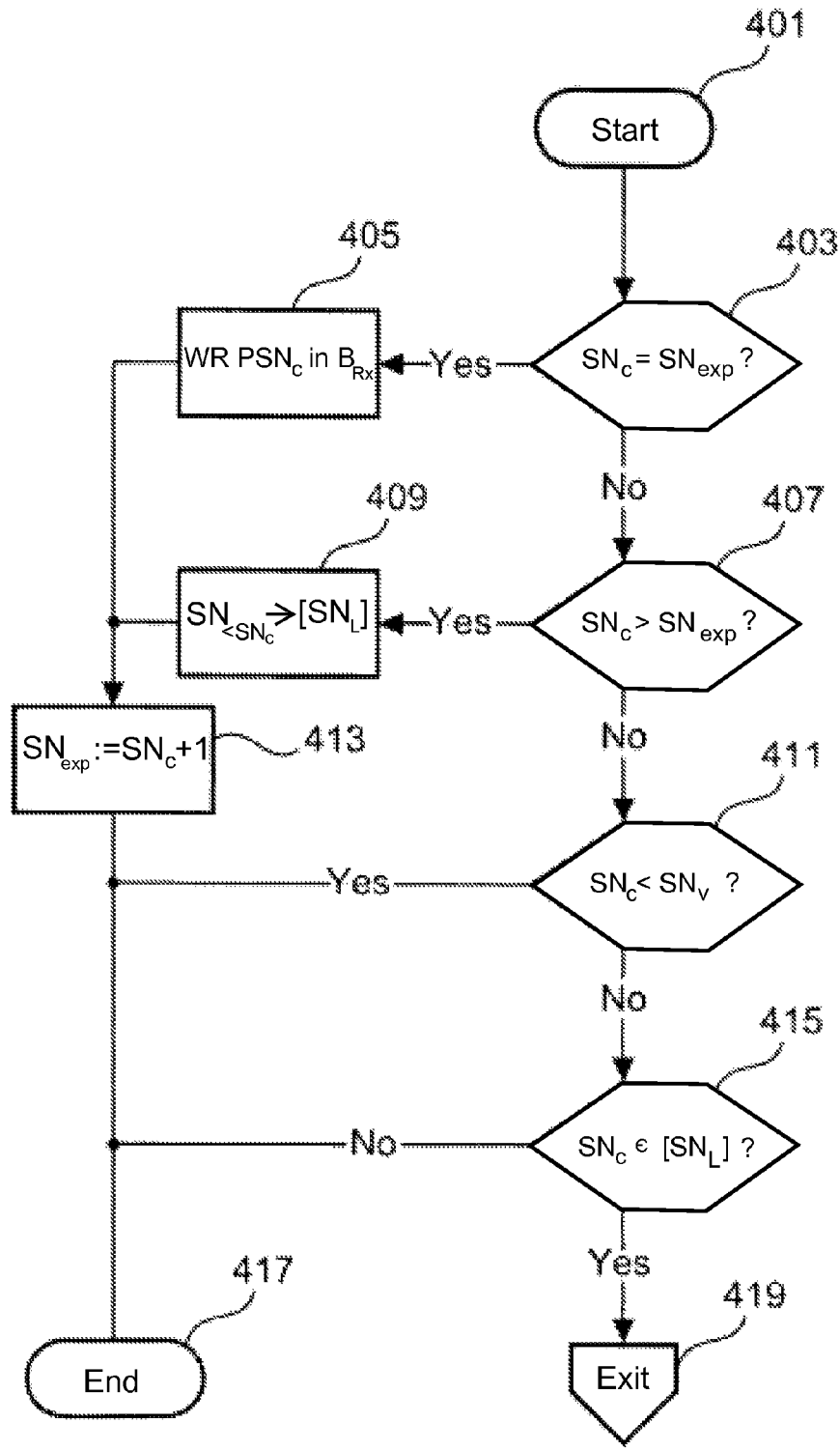
Figure 4B:
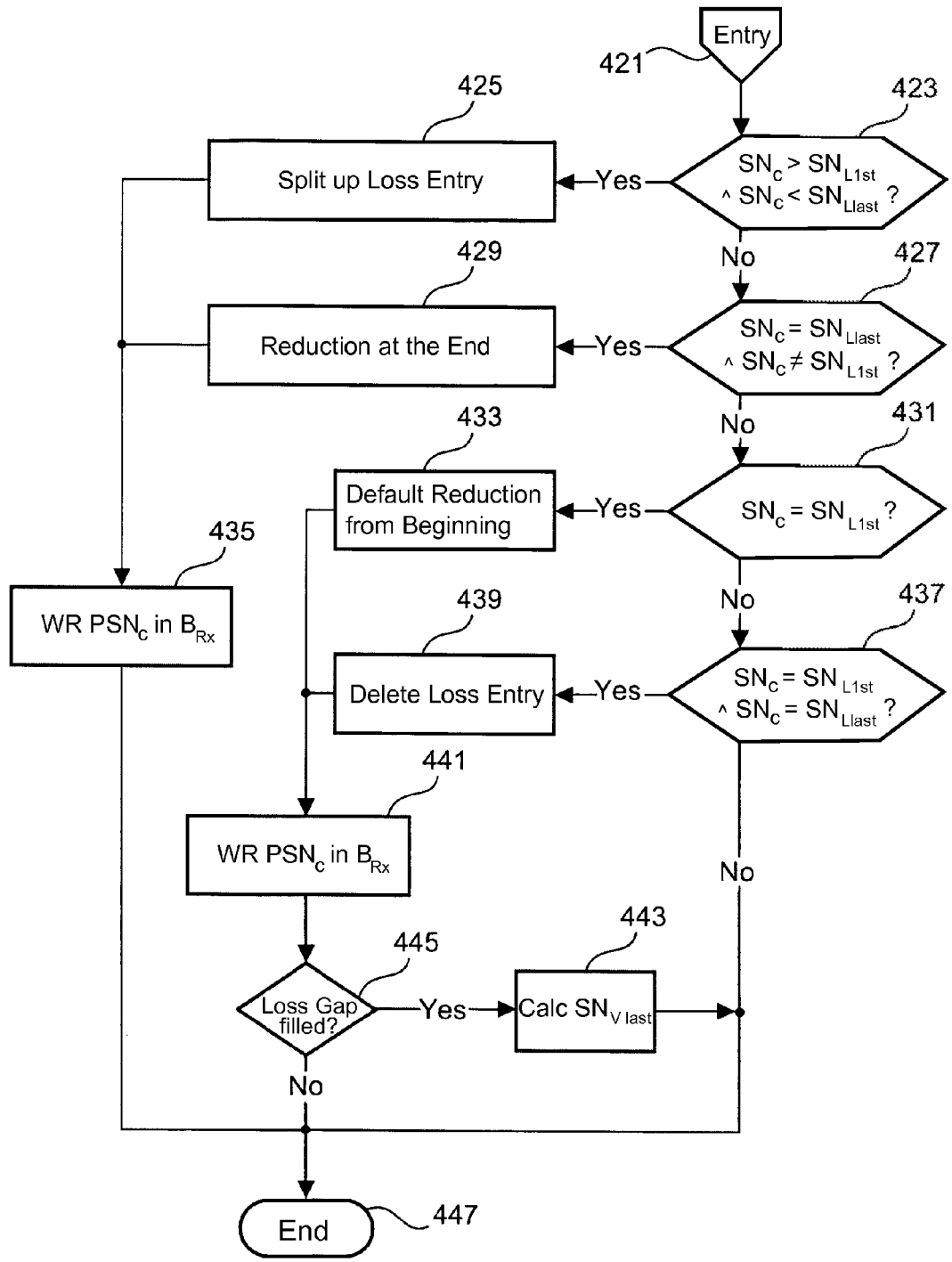

Following preferred embodiments of the invention are described in detail by referring to Figures. In the Figures show:

FIG. 1 an example of a prior art packet reception with a forward key assignment method, FIG. 2 an example of a packet reception with a reverse key assignment method, FIG. 3 an example of a structure of a packet administration map, FIG. 4a a first part of a flow chart for detecting a lost packet and updating a packet administration map and FIG. 4b a second part of the flow chart for detecting a lost packet and updating a packet administration map.

The present invention, in a preferred embodiment, proposes a method of managing a packet administration map for data packets to be received via a network, the packet administration map comprising at least one map entry comprising a search key entry and a value entry, the at least one map entry indicating a range of contiguous data packets, the method comprising the steps of: receiving a current sequence number of a current data packet, using, as a search key entry in the at least one map entry, an upper sequence number of the range of contiguous data packets, finding, dependent on the current sequence number, the at least one map entry matching the current sequence number, determining, whether or not the current sequence number falls into the range of contiguous data packets indicated by the found map entry, and updating, dependent on the result of the step of determining, the packet administration map.

In other words, a method is proposed that permits an efficient organization and operation of the packet administration map, in some cases also called loss map. Thus, a higher performance software implementation and lower CPU utilization in case of retransmission compared to a conventional method is provided.

A few assumptions are necessary for optimal performance of the proposed operation of the administration map:
1. The detected lost packets comprise more than one sequence number so that common map entries are covering at least a couple of consecutive data packet administration information.
2. Lost sequences of packets are usually retransmitted and received starting with a smaller sequence number of the packet-loss-burst and proceed with increasing sequence numbers which is a contiguous sequence of lost packets.
3. Retransmitted packets are mostly received in-order regarding the sequence numbers.

The above assumptions are likely to be fulfilled in numerous real-world network setups.

FIG. 1 illustrates the reception of missing packet sequences with a state of the art forward key assignment method for packet loss management. A sequence 100 of lost packets, in this example, is a sequence of packets 110, 120 to 130 with packet sequence numbers 21, 22, respectively 51. The sequence 100 of lost packets is accompanied by an arrow 101 indicating increasing sequence numbers. The intermediate packets are not given reference numbers here. In case, the missing packet 21 is received successfully, this event has to be tracked in a packet administration map.

In the state of the art, the packet administration map contains a key entry and a value entry, the key entry containing the sequence number of the lost packet, the value entry containing a lower packet pointer pointing to a low address in a receive buffer (not shown) where to store the newly arrived packet with sequence number 21 and a higher packet pointer pointing to a high address in the receive buffer which is the last packet in the contiguous sequence of missing packets. Upon storing the retransmitted and successfully received data packet 21 in the packet receive buffer, this event is tracked in the packet administration map by deleting the map entry with the old key 105 and creating a new map entry 115 with the sequence number of the next missing packet 120, in this example the sequence number 22, as the new key entry 115, and writing, as the value entry for the new key entry 115, receive buffer pointers, pointing to the low and the high address of the still missing packets to be stored in the receive buffer.

The method causes a high CPU load at least because the creation of a new entry in the administration map is accompanied by the creation of a new key. Thus, in a worst case, for every received packet, the packet administration map entry needs to be copied, a new key assigned and a new packet administration map entry object needs to be stored in the packet administration map.

In FIG. 2 the presently improved method is illustrated. The presently improved method is also called reverse key assignment method.

The new method comprises the following steps:
I. Storing information about a lost packet in an associative memory, containing a key and value pair. The key is the last sequence number of the detected packet-loss-burst, that is, the last sequence number of the sequence of contiguous missing packets. The value entry contains information to describe the loss sequence, at least the first lost sequence number, but for the reason of a higher redundancy also the last sequence number and a packet pointer into the receive buffer might be comprised. In other words, the key indicates the last data packet and the value entry indicates the first data packet of a sequence of contiguous data packets. As will be shown below with respect to FIG. 2, this reverse order exhibits non obvious benefits. The associative memory containing at least one key and value pair is also called packet administration map or, in short, loss map. The key and value pair is also called map entry.

II. Detecting that packets marked as lost have been received by searching for the sequence number in the loss map. This could be done as follows:
 a) Comparing the current packet sequence number of the currently received packet with the expected sequence number and store in-order packets. In case the current packet sequence number is the expected one, the packet will be stored away into the receive buffer and this method will return. Otherwise this method is continued with the following step.
 b) Compare the current sequence number with the smallest sequence number of the beginning of the loss sequences, that indicates the last valid sequence number. If the current sequence number is less than the last valid sequence number there is no need to keep the current packet. It will thus be discarded and the method will return.
 c) Search in the loss map for a key that is greater than the current sequence number and is also the closest key.
 d) Get the loss entry for this key and compare if the current sequence number is in the range of the first data packet sequence number of this loss entry and the last data packet sequence number of this loss entry, the key and the value indicating a contiguous sequence of lost buffers. In other words, it is compared whether the current packet belongs to the contiguous sequence of lost buffers. In the case, the current packet does not belong to the contiguous sequence of lost buffers, the method returns. Otherwise, the method proceeds to III.

III. Update the corresponding loss entry in order to reflect the changes. A distinction of the following cases has to be performed:
 a) Default reduction from the beginning:
  The current sequence number is equal to the first sequence number of the loss entry. In other words, the current sequence number indicates the lowest value of the range of lost packets.
  In this case, the value entry of the loss entry is updated by incrementing the value of the first sequence number and adjusting the buffer pointer address.
 b) Split up:
  The current sequence number is greater than the first sequence number and less than the last sequence number. In other words, the current sequence number indicates a packet somewhere in the range of lost packets.
  In this case, the loss entry has to be split into two entries indicating one range of packets with sequence numbers smaller than the current sequence number and another range of packets with sequence numbers larger than the current sequence number:
  First, the found loss entry is updated by updating the value entry by incrementing the current sequence number, storing the incremented current sequence number as value entry as the new first sequence number and adjusting the buffer pointer address. Thus, this loss entry now indicates only an upper part of the contiguous sequence of lost packets indicated by the original loss entry.

Second, a new loss entry is created using the first sequence number of the value entry of the found loss entry and store, as last sequence number, the current sequence number decremented by one, as the key entry in the new loss entry. The value entry of the buffer pointer address is adjusted accordingly. In other words, this newly created loss entry indicates a lower part of the contiguous sequence of lost packets indicated by the original loss entry.

c) Reduction at the end:

The current sequence number is equal to the last sequence number, i.e. to the key entry of the found loss entry.

In this case, a new loss entry is generated with the last sequence number decremented by one and stored as the key entry for the new loss entry and the first sequence number of the found loss entry is stored as the first sequence number in the new loss entry. Subsequently, the found loss entry is deleted.

This case is rather improbable and thus occurs rather infrequently.

d) Deletion

The current sequence number is equal to both the last sequence number and the first sequence number of the found loss entry. In other words, the range of the loss entry comprises exactly one sequence number. It is very likely, that the last received packet of a retransmitted burst closes the loss gap.

In this case, it is sufficient to delete the found loss entry from the loss map.

In FIG. 2, the above described method of packet reception with a reverse key assignment method is illustrated. Similar reference signs indicate similar parts or features. A range of lost contiguous packets 110 to 130 is represented by a loss entry 205. The key entry of the loss entry 205 indicates the last packet 130 of the range of contiguous packets 100. The last packet 130 is assigned to the last sequence number 230 that is in this example 51. One of the value entries of the loss entry 205 indicates the first sequence number 210 of the range of contiguous packets 100.

In the case, the outstanding packet 110 is received, according to the above described method, the packet 110 is stored away into the packet receive buffer and the value entry of the loss entry 205 is simply updated. In this example, the first sequence number in the value entry of the loss entry 205 is simply incremented from 21 to 22. As, usually, when packets are retransmitted, they are retransmitted in subsequently increasing order, the next received packet is most likely to be the outstanding packet 120, having, in this example, the sequence number 22. Again, only the first sequence number in the value entry of the loss entry 205 has to be incremented, apart from, of course, storing away the currently received packet 120.

In other words, in case a burst of retransmitted contiguous packets is successfully received, which is the most probable case in actual network implementations, none or almost no creation of new loss entries is necessary. As a consequence, the CPU is significantly relieved from managing the loss map or packet administration map. This, in turn, permits, e.g., playing back, e.g., video or audio data, without or with significantly reduced perceptual annoyances for a user. It is apparent for a person skilled in the art that the advantage of the proposed method is achieved by reversed order key administration in cooperation with retransmitted packet bursts in forward order.

FIG. 3 illustrates by way of example a packet administration map or loss map 300 comprising a plurality of loss entries with key entries 305, 315, 325 to 335. Each loss entry is provided with a value entry 310, 320, 330 to 340, respectively. In detail, each loss map value entry 310, 320, 330 to 340, respectively, corresponds to a structure 311 comprising a title 351, e.g., 'loss map value entry', the first sequence number 353 of a range of contiguous missing data packets, for the reason of redundancy the last sequence number 355 of that range, and a pointer 357 pointing into the receive buffer where the received packet will be stored.

The above described method is illustrated, by way of example, by FIGS. 4a and 4b.

FIG. 4a illustrates a first part of a flow chart for detecting a lost packet and updating a packet administration map, this first part describing the process of detecting a lost packet. The method starts at 401 and proceeds with decision diamond 403. In case the current sequence number equals the expected sequence number the method continues at 405. In the other case, the method continues with decision diamond 407. In case, in decision diamond 407, the current sequence number is larger than the expected sequence number, the method continues at 409. In the other case, the method continues with decision diamond 411. In case, in decision diamond 411, the current sequence number is smaller than the last valid sequence number, the method ends in 417. In the other case, the method continues with decision diamond 415. In case, in decision diamond 415, the current sequence number is determined to be not an element of a loss entry, the method ends at 417. In case the current sequence number is an element of a loss entry, the method continues at 419, giving control to the update loss entry part of the method. In 405, which corresponds to the evaluation, based on decision diamond 403, that the current packet is an "in order packet", the packet is stored in the receive buffer and executions continues at 413. In 409, which corresponds to the evaluation "new packet loss", in decision diamond 407, a new loss entry is created and the method continues at 413. In 413, the expected sequence number is incremented and, subsequently, the method ends at 417.

FIG. 4b illustrates a second part of the flow chart for detecting a lost packet and updating a packet administration map, this second part describing the process of updating a loss entry. This second part starts with 421 representing the entry point coming from the exit point 419 from FIG. 4a. In decision diamond 423, if the current sequence number is larger than the first sequence number and the current sequence number is smaller than the last sequence number, the action "split up loss entry" 425 has to be performed. In this case, a new loss entry with the first sequence number of the old loss entry has to be created, the last sequence number is set to current sequence number minus 1 and the old receive buffer pointer is copied; further the old loss entry is updated by setting the first sequence number to current sequence number plus 1 and the pointer to the receive buffer is calculated.

If, in decision diamond 423 the "No" branch is taken, in a further decision diamond 427 it is determined whether the current sequence number equals the last sequence number and the current sequence number does not equal the first sequence number. In case decision diamond 427 takes the "Yes" branch and the action "reduction at the end" 429 has to be performed. In this case, a new loss entry is created with last sequence number=old last sequence number minus 1, first sequence number=old first sequence number and old receive buffer pointer is taken; the old loss entry will be deleted from the loss map.

If, in decision diamond 427, the "No" branch is taken, in a further decision diamond 431 it is determined whether the current sequence number equals the first sequence number of the loss entry. In case this is true, the action "default reduction from the beginning" 433 has to be performed. The first sequence number in the loss entry will then be incremented and the pointer to the receive buffer will be calculated.

In case, in decision diamond 431, the branch "No" is taken, in a further decision diamond 437 it is determined whether the current sequence number equals the first sequence number and the current sequence number equals the last sequence number. If this is the case, the decision diamond 437 takes the "yes" branch and evaluates that the next action to be performed is "delete loss entry" in 439. The loss gap is then closed and the loss entry will be deleted from the loss map.

In case, in decision diamond 437, the "No" branch is taken, the method ends at 447.

Both actions 425 and 429 continue at 435. In 435 the pointer into the receive buffer is calculated for the current packet and the current packet is stored at the calculated position in the receive buffer. Then, the method ends in 447.

Both actions 433 and 439 continue at 441. In 441, the pointer into the receive buffer for the current packet is calculated and the current packet is stored at the calculated position in the receive buffer. The method continues in decision diamond 445 that checks whether a loss gap is filled. If a loss gap is filled, the decision diamond 445 branches "Yes" to 443 where a new last valid sequence number is calculated. After step 443, the method ends in 447. In case, in decision diamond 445 the "No" branch is taken, the method ends at 447.

The features of the invention as disclosed in the above description, in the claims and the drawing may be of importance for the implementation of the various embodiments of the invention both individually and in any desired combination.

What is claimed is:

1. A method implemented by a computer of managing a packet administration map for data packets to be received via a network, for packet groups organized in sequences of consecutive packets, the packet administration map comprising at least one map entry comprising a search key entry and a value entry, the at least one map entry indicating a range of contiguous data packets that did not arrive at a receiver, the search key entry indicating an upper sequence number and the value entry indicating a lower sequence number of the range of contiguous data packets, the method comprising the steps of:
receiving, by a central processing unit (CPU) of the computer, a current sequence number of a current data packet,
evaluating, whether the current sequence number indicates a new packet loss,
creating, once it has been found with the evaluating step that a new packet loss has occurred, a new map entry with an upper sequence number of the range of contiguous data packets which have been found to be lost, as the search key entry and the lower sequence number of the range of contiguous data packets which have been found to be lost as the value entry,
finding, when the current sequence number does not indicate a new packet loss dependent on the current sequence number, by searching the packet administration map for a target search key entry that is greater than the current sequence number and closest to the current sequence number, the at least one map entry closest to the current sequence number with the sequence number in the search key being greater than the current sequence number,
determining, whether the current sequence number falls into the range of contiguous data packets indicated by the found map entry, and
updating, dependent on the result of the step of determining, the found map entry of the packet administration map.

2. The method of claim 1, wherein the value entry of the at least one map entry comprises at least a reference to a packet in a packet buffer.

3. The method of claim 1, wherein the step of updating the packet administration map comprises at least one of:
incrementing the lower sequence number in the value entry,
creating a new map entry with the current sequence number decremented and assigned to the search key entry of the new map entry and
deleting a map entry.

4. The method of claim 1, wherein the at least one map entry matches closest with the current sequence number if the current sequence number is closest to the sequence number in the search key entry of the at least one map entry with the sequence number in the search key entry being greater than the current sequence number.

5. The method of claim 1, wherein the data packets are of different sizes.

6. The method of claim 1, wherein updating the packet administration map comprises:
if it is determined that the current sequence is equal to a lower sequence number of the range of contiguous data packets indicated by the found map entry,
incrementing the current sequence number; and
storing the incremented sequence number as the value entry of the found map entry.

7. The method of claim 6, wherein updating the packet administration map comprises:
if it is determined that the current sequence is greater than a lower sequence number of the range of contiguous data packets indicated by the found map entry and less than the upper sequence number stored as the search key of the found map entry,
decrementing the current sequence number;
creating a new map entry, wherein the decremented sequence number is stored as the search key entry of the new map entry, and the value entry of the found map entry is stored as the value entry of the new map entry;
incrementing the current sequence number; and
storing the incremented sequence number as the value entry of the found map entry.

8. The method of claim 6, wherein updating the packet administration map comprises:
if it is determined that the current sequence is equal to the upper sequence number stored as the search key entry of the found map entry,
decrementing the current sequence number;
creating a new map entry, wherein the decremented sequence number is stored as the search key entry of the new map entry, and the value entry of the found map entry is stored as the value entry of the new map entry; and
deleting the found map entry.

9. The method of claim 1, wherein updating the packet administration map comprises:

if it is determined that the current sequence is greater than a lower sequence number of the range of contiguous data packets indicated by the found map entry and less than the upper sequence number stored as the search key of the found map entry,
decrementing the current sequence number;
creating a new map entry, wherein the decremented sequence number is stored as the search key entry of the new map entry, and the value entry of the found map entry is stored as the value entry of the new map entry;
incrementing the current sequence number; and
storing the incremented sequence number as the value entry of the found map entry.

10. The method of claim 1, wherein updating the packet administration map comprises:
if it is determined that the current sequence is equal to the upper sequence number stored as the search key entry of the found map entry,
decrementing the current sequence number;
creating a new map entry, wherein the decremented sequence number is stored as the search key entry of the new map entry, and the value entry of the found map entry is stored as the value entry of the new map entry; and
deleting the found map entry.

11. A receiver for a network, the receiver configured to manage a packet administration map for data packets received via a network, having packet groups organized in sequences of consecutive packets, the packet administration map comprising at least one map entry comprising a search key entry and a value entry, the at least one map entry indicating a range of contiguous data packets that did not arrive at a receiver, the search key entry indicating an upper sequence number and the value entry indicating a lower sequence number of the range of contiguous data packets, the receiver comprising:
a central processing unit (CPU);
a memory in communication with said CPU;
wherein, said CPU is configured to:
receive a current sequence number of a current data packet,
evaluate the packet administration map to determine, whether the current sequence number indicates a new packet loss,
create, once it has been found with the evaluating step that a new packet loss has occurred, a new map entry with an upper sequence number of the range of contiguous data packets which have been found to be lost, as the search key entry,
find, when the current sequence number does not indicate a new packet loss dependent on the current sequence number, by searching the packet administration map for a target search key entry that is greater than the current sequence number and closest to the current sequence number, the at least one map entry closest to the current sequence number with the sequence number in the search key being greater than the current sequence number,
determine, whether the current sequence number falls into the range of contiguous data packets indicated by the found map entry, and
update, dependent on the result of the step of determining, the packet administration map.

12. A sender for a network, configured to manage a packet administration map for acknowledge data packets received via a network, having acknowledge packet groups organized in sequences of consecutive acknowledge packets, the packet administration map comprising at least one map entry comprising a search key entry and a value entry, the at least one map entry indicating a range of contiguous acknowledge data packets, the receiver comprising:
a central processing unit (CPU);
a memory in communication with said CPU;
wherein, said CPU is configured to:
receive a current sequence number of a current acknowledge data packet,
evaluate the packet administration map to determine, whether the current sequence number indicates a new packet loss,
create, once it has been found with the evaluating step that a new packet loss has occurred, a new map entry with an upper sequence number of the range of contiguous acknowledge data packets which have been found to be lost, as the search key entry,
find, when the current sequence number does not indicate a new packet loss dependent on the current sequence number, by searching the packet administration map for a target search key entry that is greater than the current sequence number and closest to the current sequence number, the at least one map entry closest to the current sequence number with the sequence number in the search key being greater than the current sequence number,
determine, whether the current sequence number falls into the range of contiguous acknowledge data packets indicated by the found map entry, and
update the packet administration map if the current sequence number falls into the range of contiguous acknowledge data packets indicated by the found map entry.

13. A non-transitory computer readable medium, upon which is stored instructions, wherein said instructions, when executed by a processor are adapted to cause the processor to:
receive a current sequence number of a current acknowledge data packet,
evaluate the packet administration map to determine, whether the current sequence number indicates a new packet loss,
create, once it has been found with the evaluating step that a new packet loss has occurred, a new map entry with an upper sequence number of the range of contiguous acknowledge data packets which have been found to be lost, as the search key entry,
find, when the current sequence number does not indicate a new packet loss dependent on the current sequence number, by searching the packet administration map for a target search key entry that is greater than the current sequence number and closest to the current sequence number, the at least one map entry closest to the current sequence number with the sequence number in the search key being greater than the current sequence number,
determine, whether the current sequence number falls into the range of contiguous acknowledge data packets indicated by the found map entry, and
update the packet administration map if the current sequence number falls into the range of contiguous acknowledge data packets indicated by the found map entry.

\* \* \* \* \*